US011990698B2

(12) United States Patent
Hetrick et al.

(10) Patent No.: US 11,990,698 B2
(45) Date of Patent: May 21, 2024

(54) TERMINAL FOR FLAT FLEXIBLE CABLE HAVING STRUCTURED DIMPLES

(71) Applicant: TE Connectivity Solutions GmbH, Schaffhausen (CH)

(72) Inventors: Ryan David Hetrick, Middletown, PA (US); John Mark Myer, Middletown, PA (US); Marjorie Kay Myers, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 68 days.

(21) Appl. No.: 17/690,745

(22) Filed: Mar. 9, 2022

(65) Prior Publication Data

US 2023/0291137 A1 Sep. 14, 2023

(51) Int. Cl.
*H01R 12/68* (2011.01)
*H01R 12/59* (2011.01)

(52) U.S. Cl.
CPC ........... *H01R 12/68* (2013.01); *H01R 12/592* (2013.01)

(58) Field of Classification Search
None
See application file for complete search history.

(56) References Cited

U.S. PATENT DOCUMENTS 3,156,514 A * 11/1964 Wing .................. H01R 4/2495 439/492
3,388,369 A * 6/1968 Zalmans ................ H01R 11/12 403/313
3,852,702 A * 12/1974 Dowling .................. H01R 4/26 24/30.5 R

* cited by examiner

*Primary Examiner* — Ross N Gushi

(57) ABSTRACT

A conductive terminal for a flat flexible cable comprises a first contact surface, and a second contact surface opposing the first contact surface. The first and second contact surfaces define a space therebetween for receiving a flat flexible cable along a longitudinal direction of the terminal. A structure of protruding elements is defined on the first contact surface and includes a plurality of protruding elements extending from the first contact surface in a direction of the second contact surface. The structure of protruding elements includes at least one protruding element having a first height, and at least one protruding element having a second height, distinct from the first height.

18 Claims, 7 Drawing Sheets

TERMINAL FOR FLAT FLEXIBLE CABLE HAVING STRUCTURED DIMPLES

FIELD OF THE INVENTION

The present disclosure relates to electrical terminals, and more particularly, to an electrical terminal for a flat flexible cable.

BACKGROUND

Flat flexible cables (FFCs) or flat flexible circuits are electrical components consisting of at least one conductor (e.g., a metallic foil conductor) embedded within a thin, flexible strip of insulation. Flat flexible cables are gaining popularity across many industries due to advantages offered over their traditional "round wire" counter parts. Specifically, in addition to having a lower profile and lighter weight, FFCs enable the implementation of large circuit pathways with significantly greater ease compared to a round wire-based architectures. As a result, FFCs are being considered for many complex and/or high-volume applications, including wiring harnesses, such as those used in automotive manufacturing.

A critical obstacle preventing the implementation of FFCs into these applications includes the need to develop quick, robust, and low resistance termination techniques which enable an FFC to be mating with various components. Current FFC connections to conductive terminals are primarily made using displacement crimping or welding processes which require significant tooling, fixturing and/or generalized increased cost to implement. While non-displacement crimping or welding processes and associated terminals may be used, current solutions are susceptible to reduced electrical performance over time due to creep and relaxation of the insulation of FFC, by way of example only. Further, without displacement crimping or welding on a flat terminal, there is a possibility that only one point of contact in a mating area may be present, which is problematic should a dust particle or other contaminant be trapped thereunder during assembly.

Accordingly, improved solutions for establishing reliable electrical connections with flat flexible cables are desired.

SUMMARY

In one embodiment of the present disclosure, a conductive terminal for a flat flexible cable comprises a first contact surface and a second contact surface opposing the first contact surface. The first and second contact surfaces define a space therebetween for receiving a flat flexible cable along a longitudinal direction of the terminal. A protruding structure is defined on the first contact surface and includes a plurality of protruding elements extending from the first contact surface in a direction of the second contact surface. The structure includes at least one protruding element having a first height, and at least one protruding element having a second height, distinct from the first height.

BRIEF DESCRIPTION OF THE DRAWINGS

The invention will now be described by way of example with reference to the accompanying Figures, of which.

DETAILED DESCRIPTION OF THE EMBODIMENTS

Figure 1:
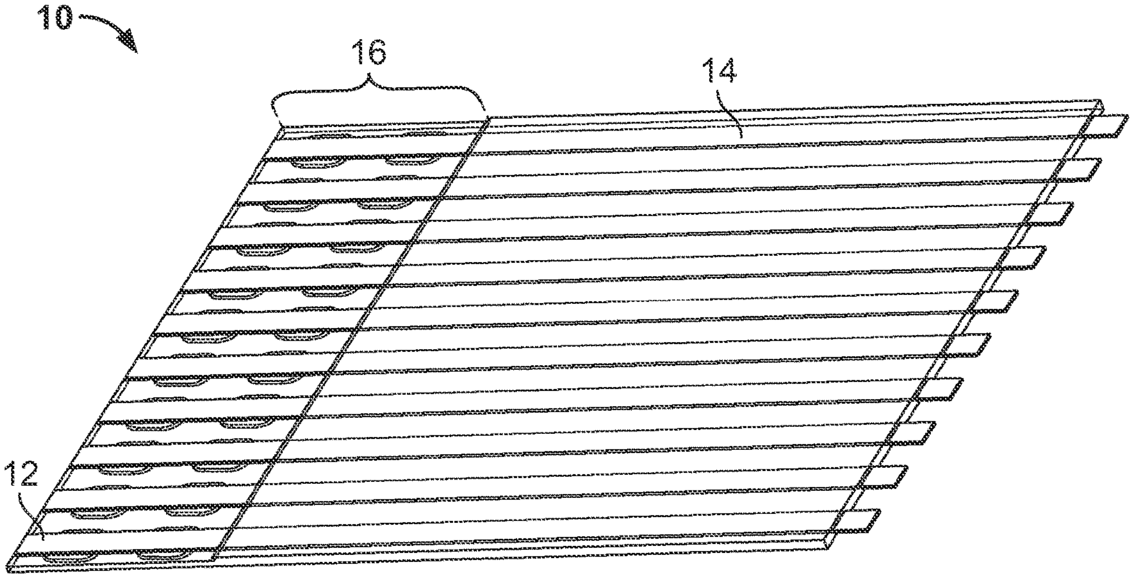
FIG. 1 is a perspective view of an exemplary FFC useful for describing embodiments of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include a conductive terminal for use with a flat flexible cable (FFC) or flat printed cable (FPC). The terminal includes opposing contact surfaces, with at least one of the contact surfaces adapted to engage an exposed conductor of an FFC. The at least one contact surface defines an arrangement of the protruding elements (e.g., predetermined in size, shape and location) dimples. The use of protruding elements promotes multiple contact points in a mating zone, resulting in lower electrical resistance over the life of the terminal, and mitigates the risk of dust or other contaminants causing additional connection disruptions.

In one embodiment, the protruding elements are staggered in height in at least one direction of the terminal (e.g., a lateral direction across a width of the terminal). The staggered height allows the terminal to maintain multiple points of electrical contact, even as the insulation of the FFC relaxes due to thermal exposure and/or pressure, by way of example only. According to another embodiment, if higher performance is desired or required, the FFC may be inverted within the terminal, top to bottom, with an insulation layer of the FFC abutting the protruding elements. After welding is performed in this orientation, the insulation will at least partially melt, and flow into valleys between protruding elements. As a result, the mechanical engagement of the FFC and the terminal is increased, and the pull-out strength and/or strain relief of the terminal assembly is improved.

As shown in FIG. 1, an exemplary illustrated segment of an FFC 10 useful for describing embodiments of the present disclosure is shown. The FFC 10 generally includes a plurality of conductors 12 embedded within an insulation material 14. The conductors 12 may comprise metallic sheet or foil, such as copper foil by way of example only, and may be patterned in any desirable configuration. The insulation material 14, such as a polymer insulation material, may be applied to either side of the conductors 12 via an adhesive, resulting in an embedded conductor arrangement. One or more portions or windows 16 of the insulation material 14 may be removed (or may not be initially applied) in select areas to expose sections of the otherwise embedded conductors 12. In the exemplary embodiment, the portion 16 of the FFC 10 defines a single continuous window exposing the ends of each of the conductors 12 on a top side thereof, while a bottom portion of the insulation material 14 remains present for added stability and strength of the FFC.

Figure 2:
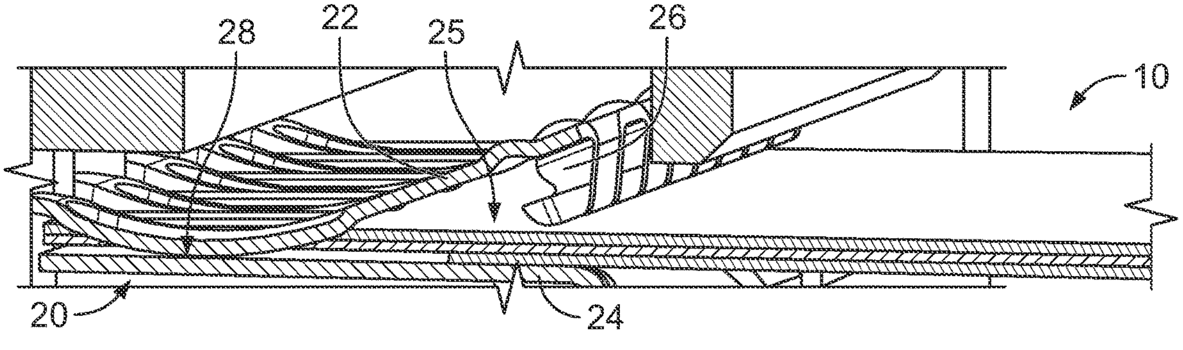
FIG. 2 is a partial side cross-sectional view of an exemplary terminal according to embodiments of the present disclosure.

Referring generally to FIG. 2, exemplary terminals 20 that may utilize protruding elements according to embodiments of the present disclosure are shown. Each terminal 20 includes a first or upper arm 22 and a second or lower arm 24. In one embodiment, the first and second arms 22,24 are connected to one another on a respective first end of each arm. The second ends of each arm 22,24 comprise free ends. In an open position, as shown in FIG. 2, the free ends define an opening 25 into which the exemplary FFC 10 may be inserted in an insertion direction parallel to a longitudinal axis of each terminal 20, and generally between each top arm 22 and each bottom arm 24. The exemplary terminals 20 each include a latch 26 formed on the first arm 22 and adapted to engage with the second arm 24 in a closed or clamping position of the terminal. With the terminal 20 in the clamped state, the first arms 22 are biased downwardly toward the second arms 24, clamping the FFC 10 therebetween. In this way, at least the first arm 22 of each terminal 20 is placed into conductive contact with a respective exposed conductor of the FFC 10 at least in a contact area 28. Embodiments of the present disclosure improve the electrical connection established in the contact area 28, including increasing the performance of the connection over the life of the terminal 20.

Figure 3:
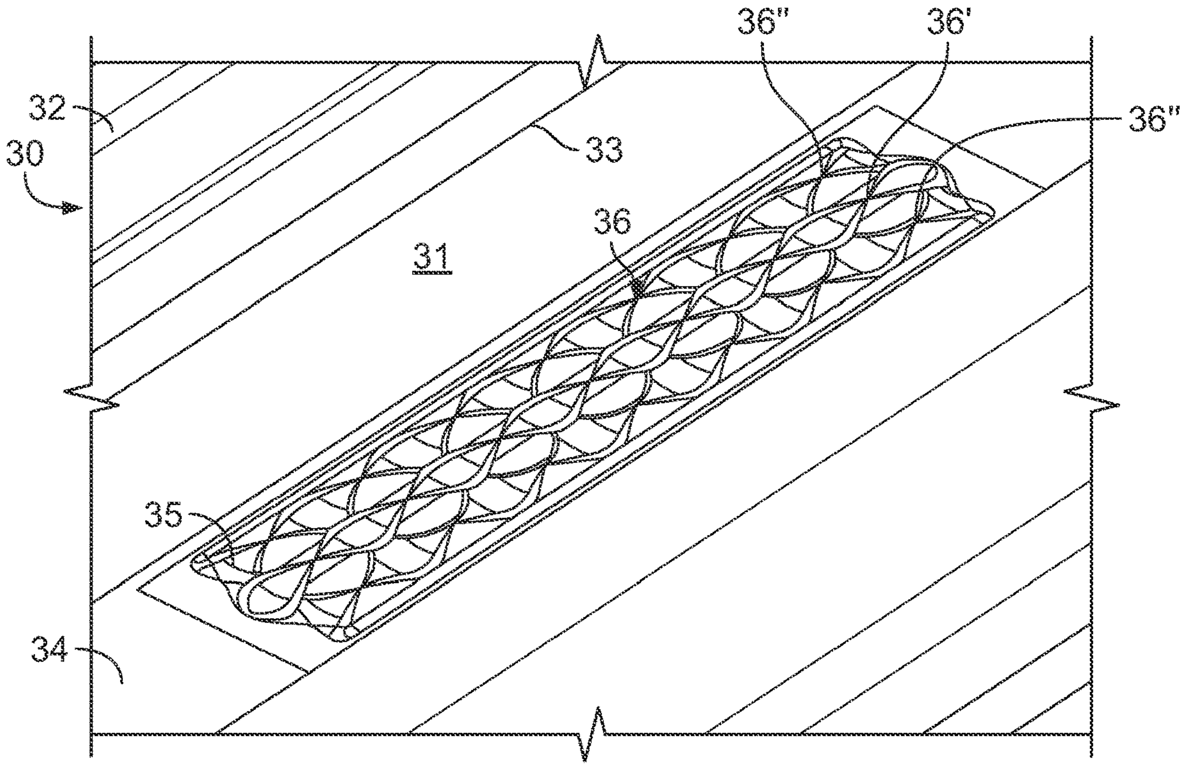
FIG. 3 is a partial side perspective view of a terminal according to an embodiment of the present disclosure.

Referring now to FIG. 3, a portion of a terminal 30 is shown having, for example, a pair of arms 32,34 (e.g., an upper and lower arm) defining a gap or opening 31 therebetween for receiving a portion of an FFC along a longitudinal or insertion direction, as described above with respect to FIG. 2. Each of the pair of arms 32,34 defines a respective contact surface 33,35 that oppose one another across the opening 31 in an open state of the terminal 30. In the exemplary embodiment, the contact surface 35 of the arm 34 comprises a pattern of repeated protrusions 36 formed thereon. While the arm 34 is shown as having the protruding elements 36 on the contact surface 35, the contact surface 33 of the arm 32 may comprise this feature in addition to, or in place of, their presence on the arm 34. The protruding elements, and more specifically, the plurality of protruding elements 36 extend from the contact surface 35 into the opening 31 in a direction of the contact surface 33. The plurality of protruding elements 36 include at least one protruding element having a first height, and at least one protruding element having a second height, distinct from the first height. For example, the exemplary illustrated embodiment comprises first protruding elements 36' having a height greater than that of adjacent second protruding elements 36".

Figure 4:
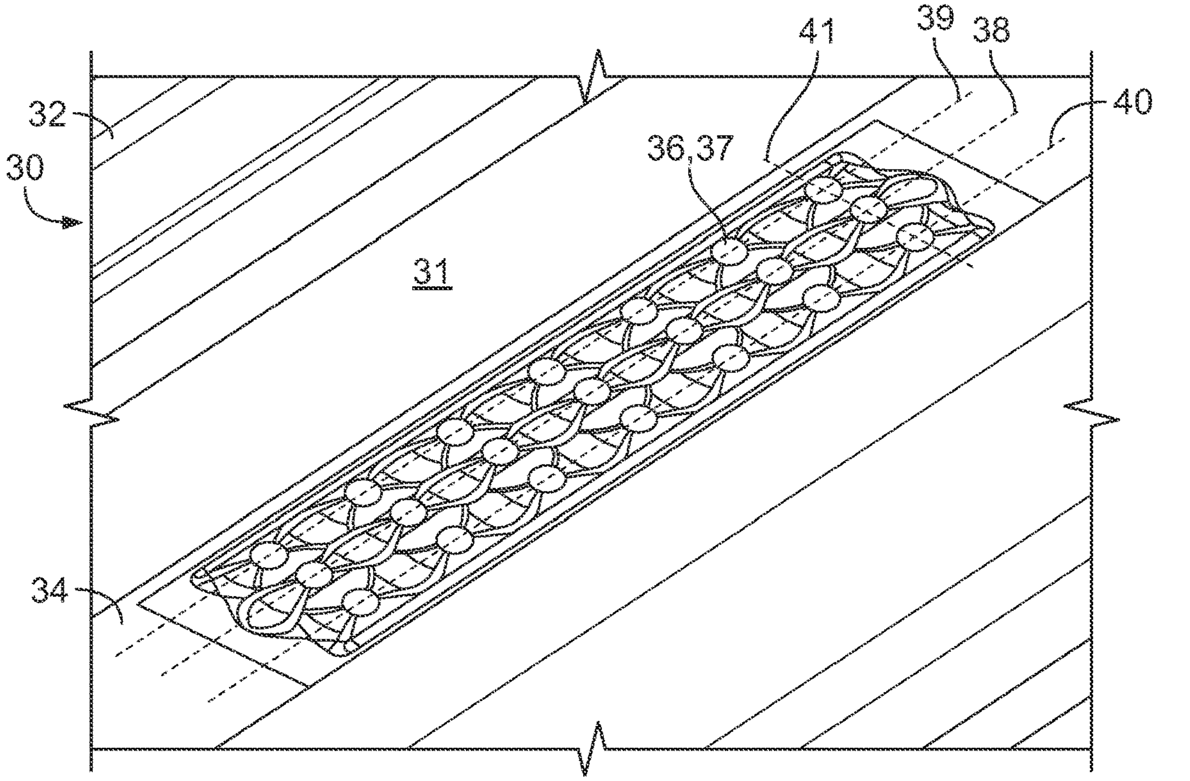
FIG. 4 is another partial side perspective view of the terminal of FIG. 3.

More specifically as shown in FIGS. 3 and 4, the plurality of protruding elements 36 are formed in a periodic or repeating pattern, and include a first row 38 of protruding elements 36' extending in the longitudinal direction of the terminal. In the illustrated embodiment, the first row 38 of protruding elements 36' is generally centered on the contact surface 35 of the terminal 30. The pattern further includes a second row 39 of protruding elements 36" arranged adjacent to the first row 38 of protruding elements 36' and extending in the longitudinal direction. A third row 40 of protruding elements 36" is arranged adjacent the first row 38 of protruding elements 36' on a side thereof opposite the second row 39 of protruding elements 36", and extending in the longitudinal direction. As described above, the protruding elements 36' of the first row 38 have a height greater than a height of the protruding elements 36" of the second and third rows 39,40. Each of the protruding elements 36',36" may comprise a peak or apex 37 (illustrated via a circle in FIG. 4) centered along a centerline of a respective one of the rows 38,39,40. The peaks 37 may be evenly spaced in each of the longitudinal and lateral directions. As further illustrated, respective protruding elements 36 of the first, second and third rows are aligned in columns 41 across the terminal 30 in a lateral direction, transverse to the longitudinal direction.

Figure 5:
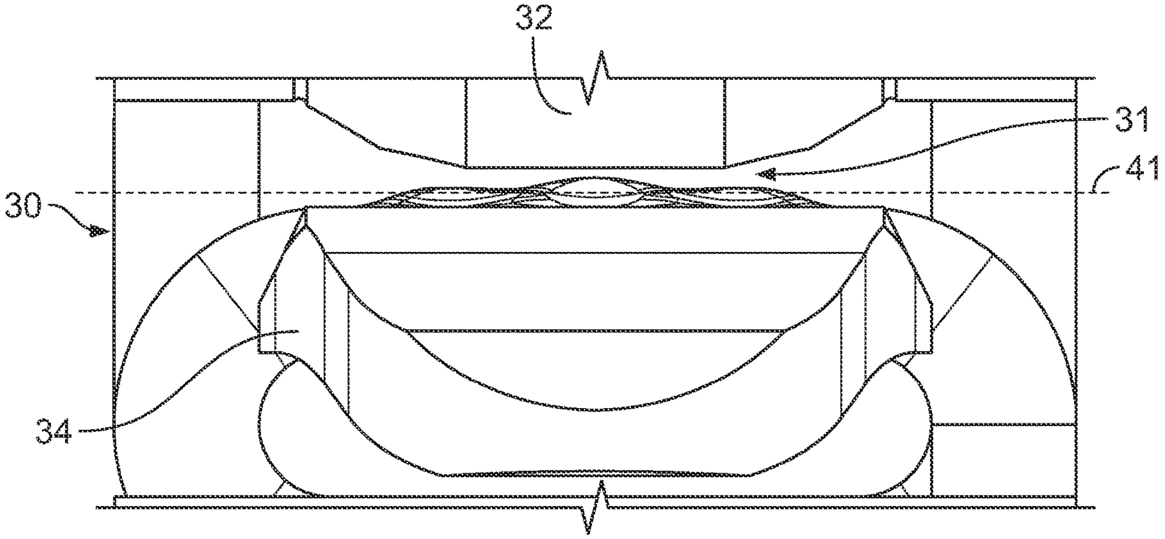
FIG. 5 is a front view of the terminal of FIG. 3.
Figure 6:
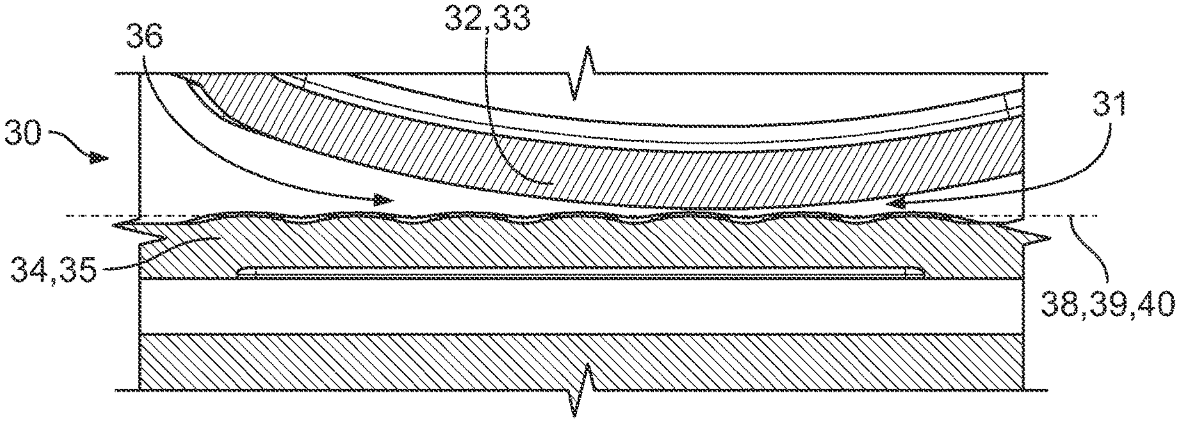
FIG. 6 is a side view of the terminal of FIG. 3.

As most clearly shown in FIG. 5, each of the columns 41 of protruding elements 36 define a wave-shaped cross-section in the lateral direction of the terminal. Likewise, each of the rows 38,39,40 of protruding elements 36 define a wave-shaped cross-section in the longitudinal direction of the terminal 30, as shown in FIG. 6. In this way, the pattern of 36 is continuous, with no planar surfaces arranged therebetween. As shown, the peak or apex 37 of each protruding element 36 is generally rounded or dome-shaped.

Still referring to FIGS. 5 and 6, in the exemplary embodiment, the top or upper arm 32 may be arcuate in profile, or convex with respect to the contact surface 35 of the lower arm 34. In the exemplary embodiment, an axis of a radius of curvature of the contact surface 33 of the arm 32 is oriented transverse to the longitudinal direction of the terminal 30. The arcuate nature of the arm 32 may enable its function as an elastic beam or spring for applying an elastic force in a direction of the contact surface 35, and thus on an FFC arranged within the opening 31. In one embodiment, the lowest point of the contact surface 33 may be oriented generally centrally with respect to the pattern of protruding elements 36 with the terminal in a clamped or closed position.

Figure 7:
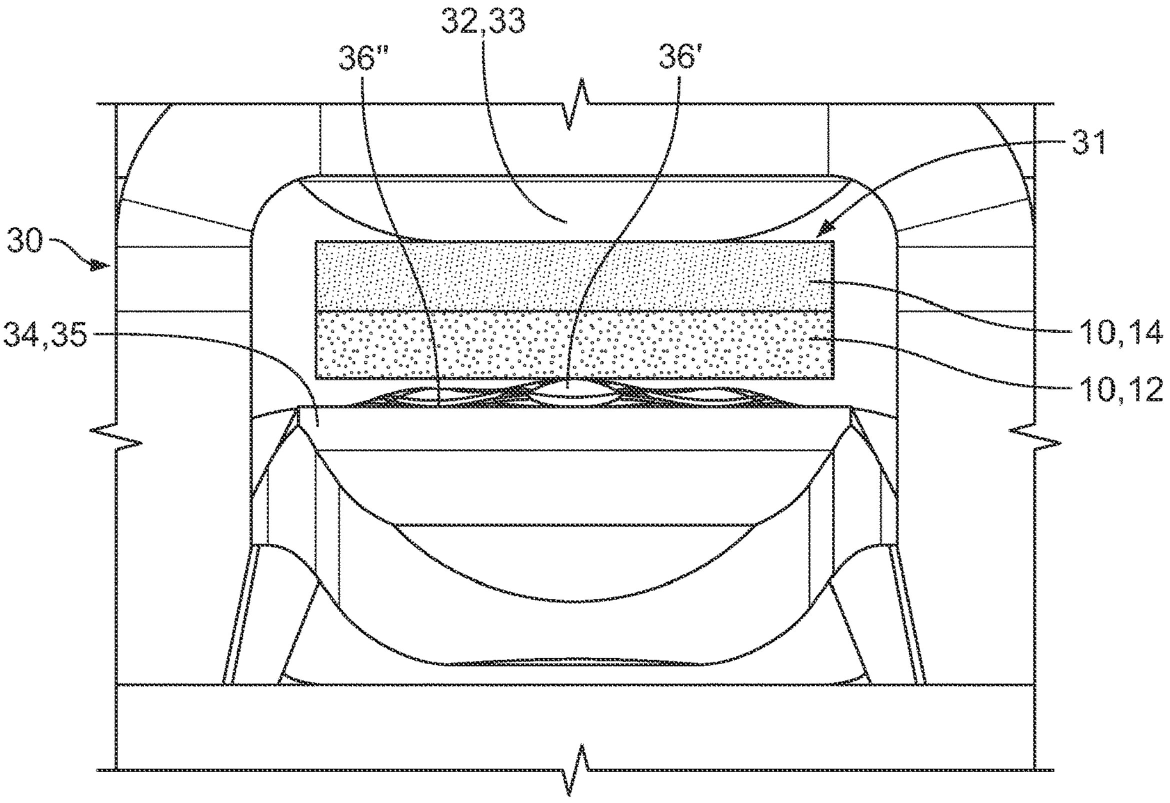
FIG. 7 is a front view of the terminal of FIG. 3 with an FFC inserted therein in an initial state.
Figure 8:
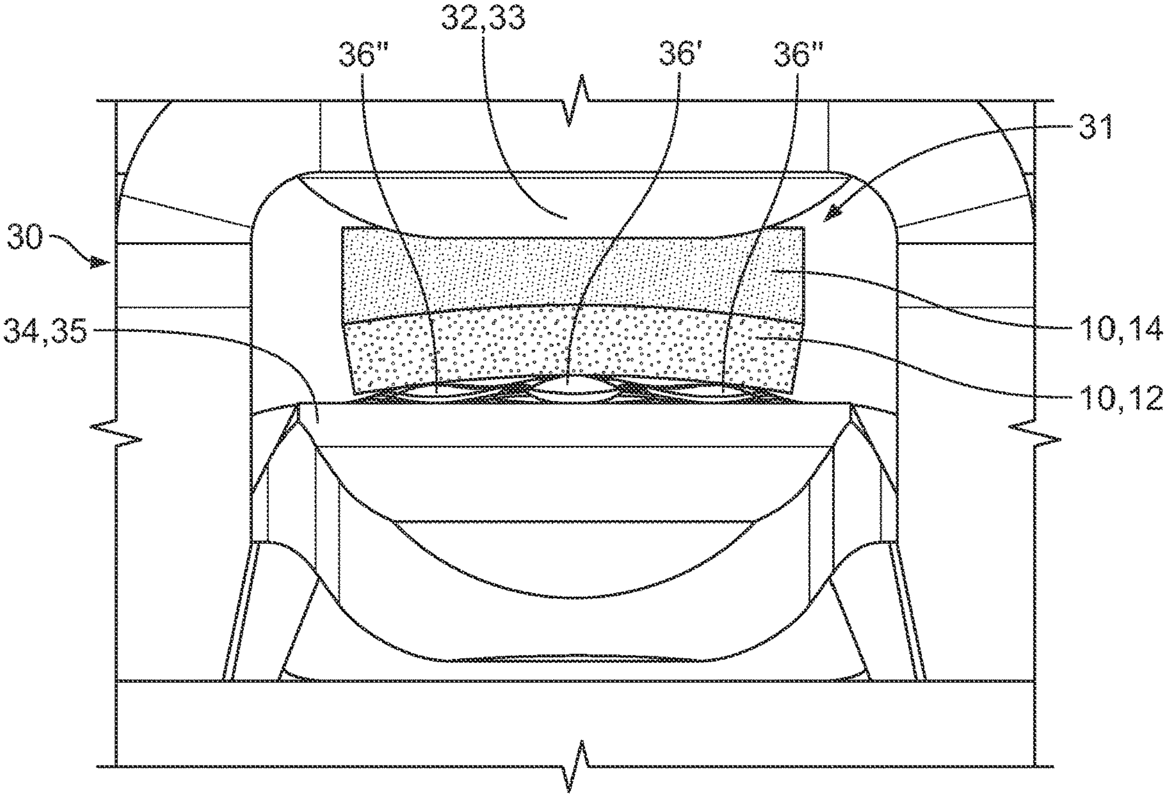
FIG. 8 is a front view of the terminal of FIG. 7 with the FFC in a relaxed state.

Referring now to FIGS. 7 and 8, advantages of a terminal and protruding element structure according to the present disclosure may be visualized. For example, in one embodiment, a terminal assembly includes the above-described terminal 30 and the FFC 10. The conductor 12 of the FFC 10 (i.e., a single conductor) is arranged in opposing contact with the contact surface 35 of the arm 34. The insulation material 14 of the FFC 10 is arranged on a side of the conductor 12 facing the contact surface 33 of the arm 32. As illustrated, after being installed within the opening 31, only or substantially only the protruding elements 36' are initially in conductive contact with the contact surface 35. The protruding elements 36" do not make conductive contact with the surface 35.

As set forth above, and referring to FIG. 8, over time the FFC 10 relaxes. For example, one or both of the conductor 12 or the insulation material 14 may decrease in stiffness, and as a result, deforms to more closely conform to the shape of the contact surfaces 33,35. This may be the result of, for example, heat and/or material fatigue. As the FFC 10 relaxes, the conductor 12 may also contact or engage with the protruding elements 36" arranged laterally with respect to the protruding elements 36'. In this way, more consistent conductive contact with multiple protruding elements 36 is maintained regardless of any change in mechanical characteristics of the terminal 30 and/or the FFC 10. This arrangement also mitigates the risk of only a single point of contact between the terminal 30 and the FFC 10.

Figure 9:
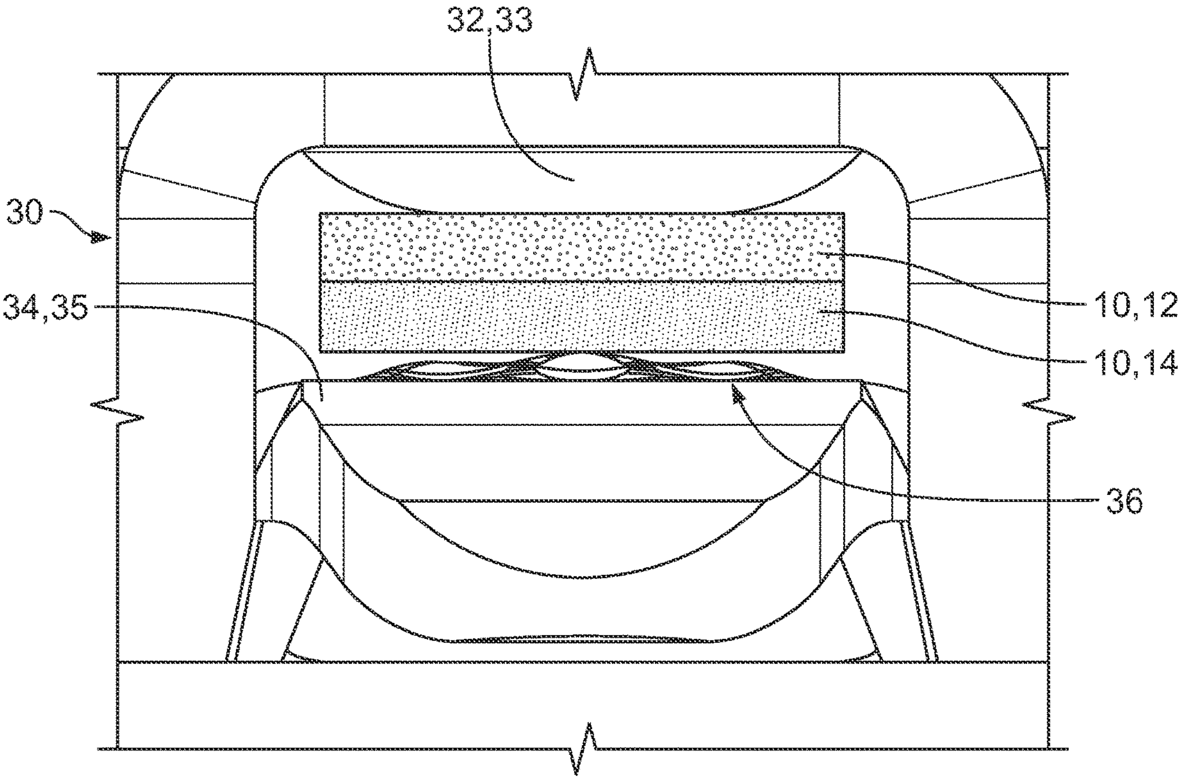
FIG. 9 is another front view of the terminal of FIG. 3 with an FFC inserted therein in an initial state.
Figure 10:
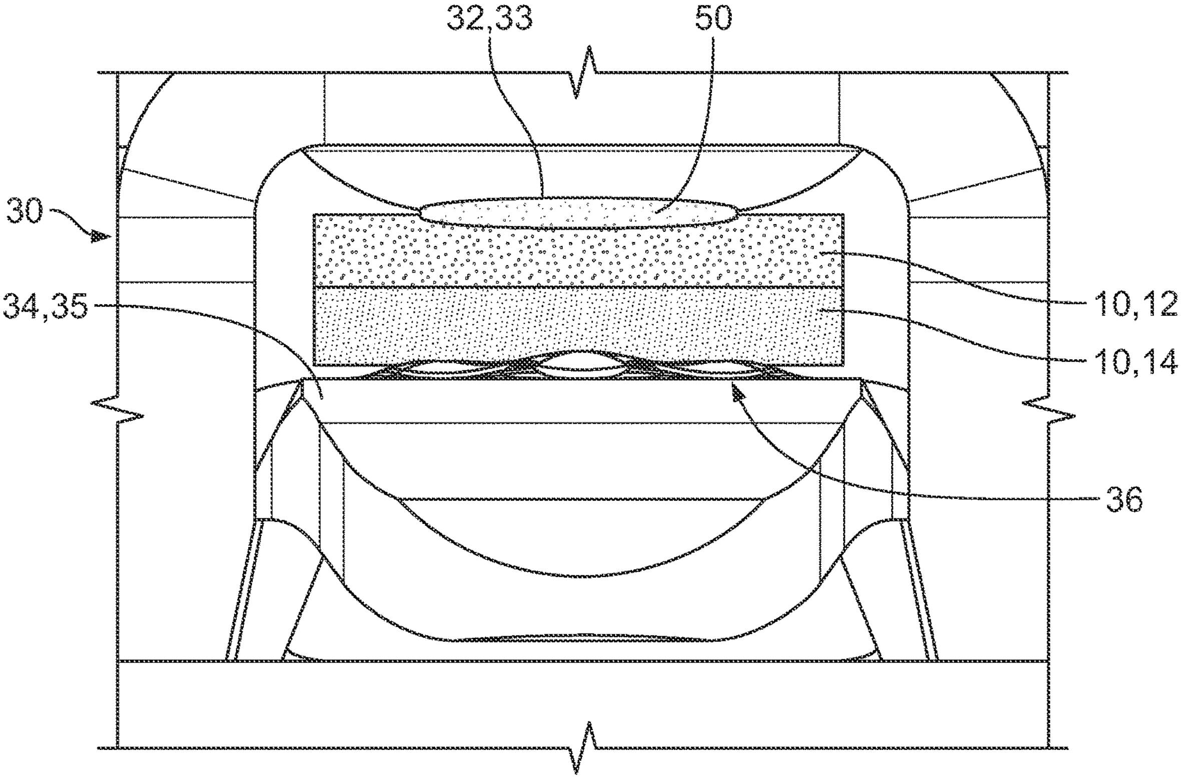
FIG. 10 is a front view of the terminal of FIG. 9 after a welding operation.

FIGS. 9 and 10 illustrate another embodiment of the present disclosure in which the FFC 10 has been inserted into the terminal 30 in an inverted orientation relative to the embodiment shown in FIGS. 7 and 8. Specifically, the conductor 12 is oriented so as to oppose the contact surface 33 of the arm 32, and the insulation 14 opposes the patterned protruding elements 36 formed on the contact surface 35 of the arm 34. In this embodiment, the conductor 12 may be welded to the contact surface 33 of the arm 32. As a welding operation is performed, heat generated by the weld 50 will soften the insulation material 14 as it is at least partially melted. As a result, the insulation material will flow into valleys defined between, or of, the protruding elements 36, increasing the mechanical engagement of the FFC 10 and the terminal 30, and improving pull-out strength and/or strain relief of the FFC/terminal assembly.

Figure 11:
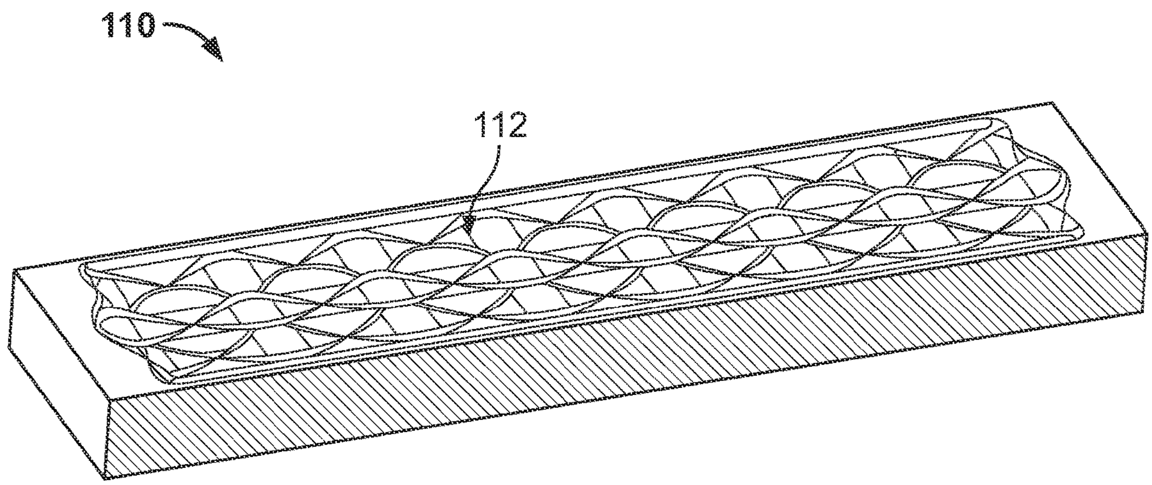
FIG. 11 is a perspective view of an exemplary die or tool used to form the pattern of protruding elements according to an embodiment of the present disclosure.
Figure 12:
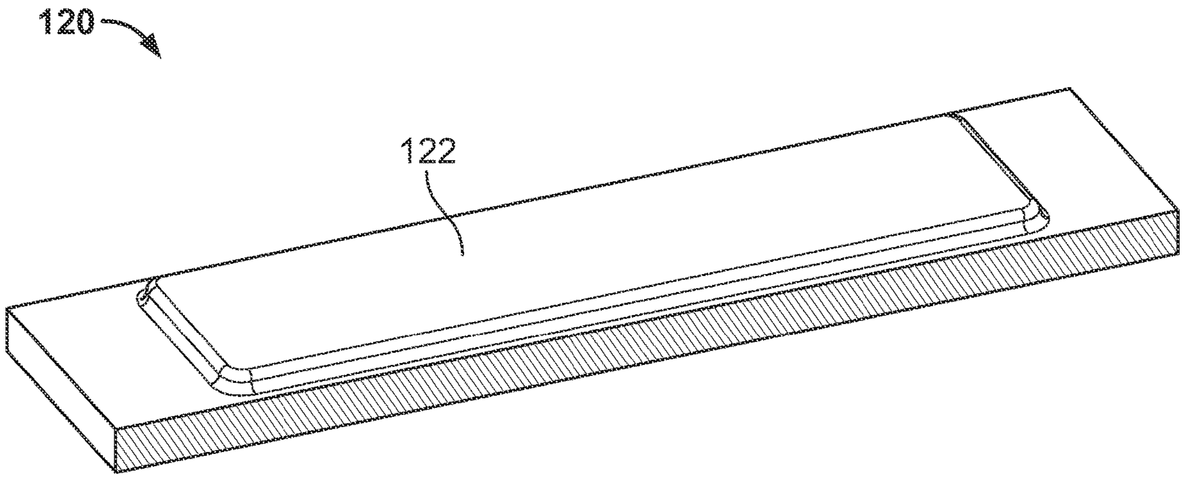
FIG. 12 is a perspective view of an exemplary punch tool used to form the pattern of protruding elements according to an embodiment of the present disclosure.

FIGS. 11 and 12 illustrate simplified tooling for forming the protruding elements according to embodiments of the present disclosure. For example, the protruding elements 36 may be formed by a punching or stamping operation. Specifically, a stationary tool or die 110 has a contact surface 112 defining a pattern of protruding elements, as described above. With a terminal (or terminal stock) arranged on the die 110, a punch tool 120 including an elevated striking surface 122 may be used to strike the terminal in a direction toward the die for forming the pattern of protruding elements therein. Of course, other manufacturing operations may be utilized to form the pattern including, but not limited to, molding, machining, rolling, etc.

Figure 13:
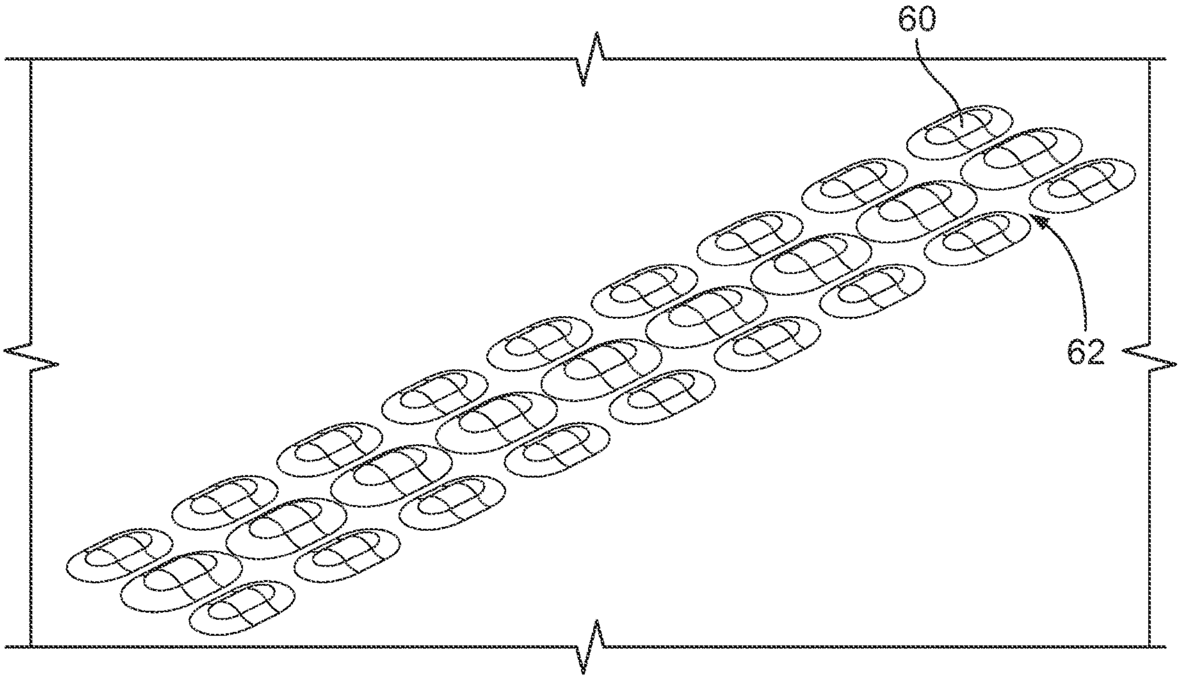
FIG. 13 is a perspective view of another terminal surface according to an embodiment of the present disclosure.
Figure 14:
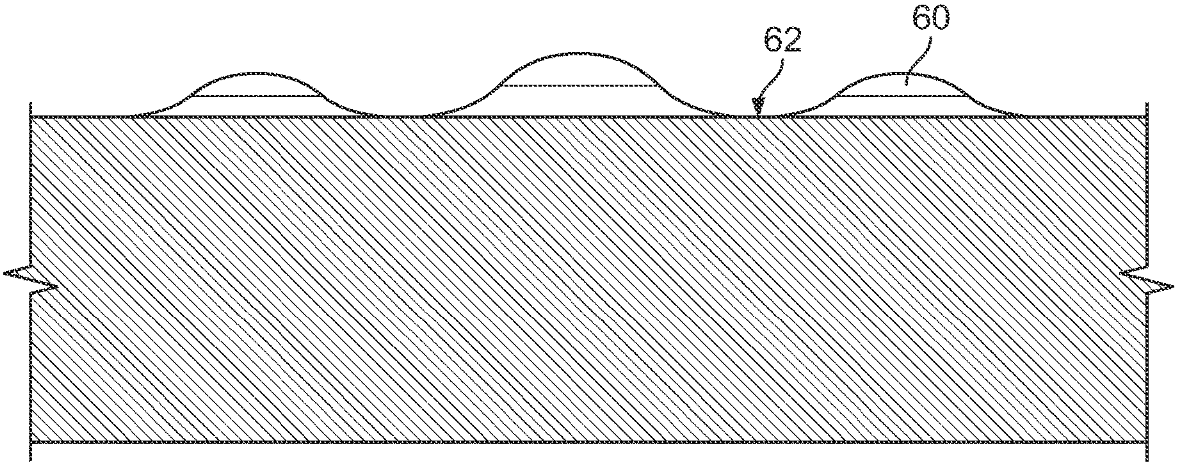
FIG. 14 is a side view of the terminal surface of FIG. 13.

Finally, referring to FIGS. 13 and 14, a structure having protruding elements according to another embodiment of the present disclosure includes a plurality of discrete protruding elements 60 extending from a generally planar contact surface 62. The planar contact surface 62 is defined between and separates each discrete protruding element 60. In the exemplary embodiment, each of the plurality of protruding elements defines an elongated dome-shape extending in the longitudinal direction of the contact surface 62 (or associated terminal). Each protruding element 60 may be defined, at least in part, by a radius of curvature having an axis extending in the longitudinal direction of the terminal.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A conductive terminal for a flat flexible cable having an exposed conductor, comprising:

a first contact surface comprising a spring arm; and a second contact surface comprising a spring arm opposing the first contact surface, the first and second contact surfaces defining a space therebetween for receiving and holding therebetween by a force from the spring arms a flat flexible cable along a longitudinal direction of the terminal; and a plurality of protruding elements defined on the first contact surface, the protruding elements continuously adjacent one another and extending from the first contact surface in a direction of the second contact surface and including at least one protruding element having a first height, and at least one protruding element having a second height, distinct from the first height wherein at least one of the first and second contact surfaces makes electrical contact with the exposed conductor.

2. The terminal of claim 1, wherein the plurality of protruding elements include a first row of protruding elements extending in the longitudinal direction of the terminal.

3. The terminal of claim 2, wherein the plurality of protruding elements include a second row of protruding elements arranged adjacent to the first row of protruding elements and extending in the longitudinal direction, and a third row of protruding elements arranged adjacent the first row of protruding elements on a side opposite the second row of protruding elements and extending in the longitudinal direction.

4. The terminal of claim 3, wherein the protruding elements of the first row of protruding elements having a height greater than a height of the protruding elements of the second and third rows of protruding elements.

5. The terminal of claim 4, wherein respective protruding elements of the first, second and third rows are aligned in columns in a lateral direction of the terminal.

6. The terminal of claim 1, wherein each of the columns of protruding elements define an undulating cross-section in a lateral direction of the terminal.

7. The terminal of claim 6, wherein each of the rows of protruding elements define an undulating cross-section in the longitudinal direction of the terminal.

8. The terminal of claim 1, wherein each of the plurality of protruding elements defines an elongated dome-shape extending in the longitudinal direction.

9. A terminal assembly, comprising:

a conductive terminal, including:

a first contact surface comprising a spring arm; and a second contact surface comprising a spring arm opposing the first contact surface, the first and second contact surfaces defining a space therebetween for receiving a flat flexible cable along a longitudinal direction of the terminal height, a force from the spring arms causing at least one of the first and second contact surfaces to make electrical contact with the exposed conductor; and a structure with protruding elements defined on the first contact surface, the structure comprising a plurality of continuously adjacent protruding elements extending from the first contact surface in a direction of the second contact surface and including at least one protruding element having a first height, and at least one protruding element having a second height, distinct from the first height; and a flat flexible cable having a conductor exposed through an insulation material and received within the space between the first and second contact surfaces of the terminal.

10. The assembly of claim 9, wherein the plurality of protruding elements include a first plurality of extending from the first contact surface and into the space to a first height, and a second plurality of extending from the first contact surface and into the space to a second height less than the first height.

11. The assembly of claim 10, wherein the exposed conductor of the flat flexible cable is arranged in abutting contact with the first contact surface, and the insulation material is arranged on a side of the flat flexible cable opposite an exposed face of the conductor and abuts the second contact surface.

12. The assembly of claim 10, wherein the terminal includes a first arm and a second arm, the first arm defining the first contact surface and the second arm defining the second contact surface, the first arm movable relative to the second arm between a receiving position and a clamping position for selectively fixing the flat flexible cable between the first and second contact surfaces.

13. The assembly of claim 12, wherein the terminal includes a latching tab extending between the first and second arms for fixing the terminal in the clamping position.

14. The assembly of claim 9, wherein the conductor of the flat flexible cable is welded to the second contact surface.

15. The assembly of claim 14, wherein the insulation material is melted on the first contact surface and adopts a shape of the plurality of protruding elements.

16. The assembly of claim 9, wherein the plurality of protruding elements include:

a first row of protruding elements extending in the longitudinal direction of the terminal;

a second row of protruding elements arranged adjacent to the first row of protruding elements and extending in the longitudinal direction; and a third row of protruding elements arranged adjacent the first row of protruding elements on a side opposite the second row of protruding elements and extending in the longitudinal direction.

17. The assembly of claim 16, wherein the protruding elements of the first row of protruding elements have a height greater than a height of the protruding elements of the second and third rows of protruding elements.

18. The assembly of claim 17, wherein respective protruding elements of the first, second and third rows are aligned in columns in a lateral direction of the terminal, each of the columns of protruding elements and each of the rows of protruding elements define an undulating cross-section in the lateral and longitudinal directions of the terminal, respectively.

* * * * *